US010080191B2

(12) United States Patent
Li et al.

(10) Patent No.: US 10,080,191 B2
(45) Date of Patent: Sep. 18, 2018

(54) WIRELESS DEVICE, METHOD, AND COMPUTER READABLE MEDIA FOR TRANSMITTING AND RECEIVING BEACON FRAMES ON DIFFERENT SUB-CHANNELS

(71) Applicant: Intel IP Corporation, Santa Clara, CA (US)

(72) Inventors: Guoqing C. Li, Portland, OR (US); Shahrnaz Azizi, Cupertino, CA (US); Robert J. Stacey, Portland, OR (US); Eldad Perahia, Portland, OR (US); Thomas J. Kenney, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 673 days.

(21) Appl. No.: 14/670,090

(22) Filed: Mar. 26, 2015

(65) Prior Publication Data

US 2016/0286485 A1 Sep. 29, 2016

(51) Int. Cl.
*H04W 52/02* (2009.01)
*H04L 5/00* (2006.01)
(Continued)

(52) U.S. Cl.
CPC ....... *H04W 52/0216* (2013.01); *H04L 5/0007* (2013.01); *H04W 8/005* (2013.01);
(Continued)

(58) Field of Classification Search
CPC ............. H04W 48/20; H04W 52/0219; H04W 56/001; H04W 76/025; H04W 84/02;
(Continued)

(56) References Cited

U.S. PATENT DOCUMENTS

2011/0116401 A1* 5/2011 Banerjea ........... H04W 74/0816
370/252
2011/0243025 A1* 10/2011 Kim ..................... H04L 5/0023
370/252
(Continued)

FOREIGN PATENT DOCUMENTS

WO WO-2016153616 A1 9/2016

OTHER PUBLICATIONS

"International Application Serial No. PCT/US2016/017247, International Search Report dated Jun. 29, 2016", 3 pgs.
(Continued)

*Primary Examiner* — Romani Ohri
(74) *Attorney, Agent, or Firm* — Schwegman Lundberg & Woessner, P.A.

(57) ABSTRACT

Wireless devices, methods, and computer-readable media for transmitting and receiving beacon frames are disclosed. A master station is disclosed. The master station may include circuitry configured to operate in accordance with orthogonal frequency division multiple access (OFDMA) on a plurality of sub-channels and a primary channel. The circuitry may be further configured to assign a high-efficiency wireless local-area network (HEW) station to a sub-channel and transmit a legacy beacon on the primary channel with a first period. The circuitry may be further configured to transmit a HEW beacon on the sub-channel with a second period, wherein the second period is greater than the first period. The circuitry may be further configured to determine that the HEW station has data at the master station, and to transmit the HEW beacon on the sub-channel with an indication that the HEW station has the data. A HEW station is disclosed for receiving HEW beacons.

21 Claims, 6 Drawing Sheets

(51) Int. Cl.
  *H04W 8/00* (2009.01)
  *H04W 84/12* (2009.01)
  *H04W 48/12* (2009.01)

(52) U.S. Cl.
  CPC ............ *H04W 48/12* (2013.01); *H04W 84/12* (2013.01); *Y02D 70/00* (2018.01); *Y02D 70/1226* (2018.01); *Y02D 70/1262* (2018.01); *Y02D 70/142* (2018.01); *Y02D 70/144* (2018.01); *Y02D 70/146* (2018.01); *Y02D 70/26* (2018.01)

(58) Field of Classification Search
  CPC ..... H04W 88/06; H04W 72/12; H04W 52/02; H04W 72/04; H04L 5/00
  See application file for complete search history.

(56) References Cited

U.S. PATENT DOCUMENTS

| | | |
|---|---|---|
| 2013/0230035 A1 | 9/2013 | Grandhi et al. |
| 2013/0279381 A1* | 10/2013 | Sampath ............... H04W 48/08 370/311 |
| 2014/0086200 A1 | 3/2014 | Seok |
| 2015/0023335 A1* | 1/2015 | Vermani .............. H04B 7/0452 370/338 |
| 2015/0063327 A1 | 3/2015 | Barriac et al. |
| 2015/0071272 A1 | 3/2015 | Vermani et al. |
| 2016/0072654 A1* | 3/2016 | Choi ................... H04L 27/2602 370/329 |
| 2017/0202016 A1* | 7/2017 | Itagaki .................. H04W 74/08 |

OTHER PUBLICATIONS

"International Application Serial No. PCT/US2016/017247, Written Opinion dated Jun. 29, 2016", 5 pgs.

Yu, Cai, et al., "Discussion on DL-OFDMA Sub-channel Indication Method", IEEE 802.11-15/0384r0, (Mar. 9, 2015), 3-6.

* cited by examiner

WIRELESS DEVICE, METHOD, AND COMPUTER READABLE MEDIA FOR TRANSMITTING AND RECEIVING BEACON FRAMES ON DIFFERENT SUB-CHANNELS

TECHNICAL FIELD

Some embodiments relate to wireless local-area networks (WLANs) operating in accordance with orthogonal frequency division multiple access (OFDMA) with scheduled transmission periods for high efficiency WLAN (HEW) beacons on different sub-channels. Some embodiments relate to assigning HEW stations to sub-channels based on a scheduled transmission period for the sub-channel, and some embodiments relate to power saving for HEW stations. Some embodiments relate to Institute of Electronic and Electrical Engineers (IEEE) 802.11, and some to 802.11ax.

BACKGROUND

One issue with communicating data over a wireless network is transmitting and receiving beacon frames. Often stations (STAs) need to receive beacon frames from master stations or access points (APs) to communicate properly with the APs. A STA may consume power in tuning to a channel to receive a beacon frame and synchronize with an AP.

Another issue with communicating data over a wireless network is that often more than one standard may be in use in a wireless local-area network (WLAN). For example, Institute of Electronic and Electrical Engineers (IEEE) 802.11ax, referred to as high efficiency WLAN (HEW), may need to be used with legacy versions of 802.11.

Thus, there are general needs for systems and methods that allow access points to transmit beacon frames and stations to receive beacon frames. There are also general needs for systems and methods that allow HEW devices to coexist with legacy devices.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
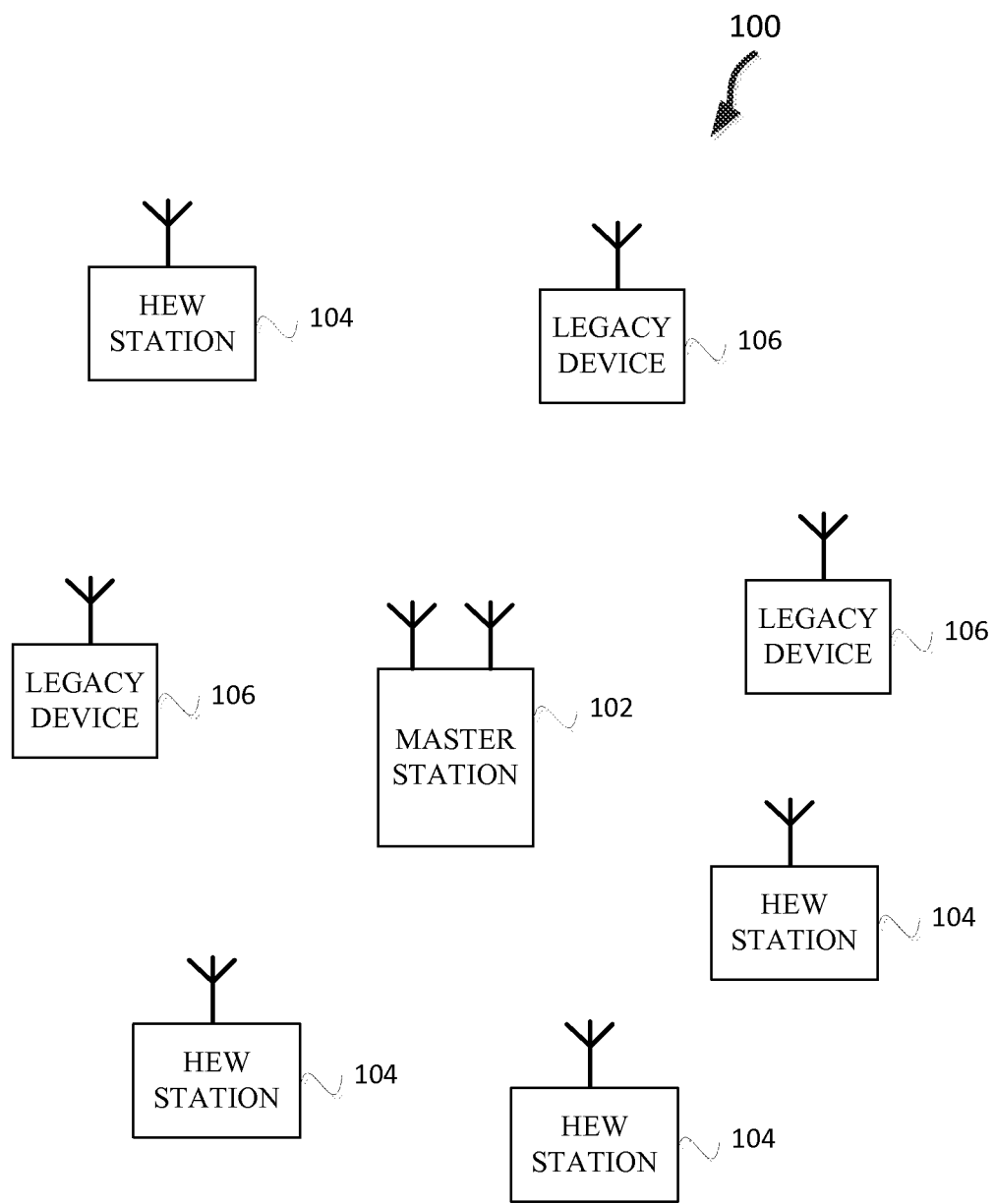
FIG. 1 illustrates a wireless network in accordance with some embodiments.

FIG. 1 illustrates a wireless local-area network (WLAN) in accordance with some embodiments. The WLAN may comprise a basis service set (BSS) 100 that may include a master station 102, which may be an access point (AP); a plurality of high-efficiency WLAN (HEW) (e.g., IEEE 802.11ax) stations 104; and a plurality of legacy (e.g., IEEE 802.11n/ac) devices 106.

The master station 102 may be an access point (AP) using the 802.11 communications protocol to transmit and receive. The master station 102 may be a base station. The master station 102 may be a master station. The master station 102 may be a HEW master station. The master station 102 may use other communications protocols as well as the 802.11 protocol. The 802.11 protocol may be 802.11 ax. The 802.11 protocol may include using Orthogonal Frequency-Division Multiple Access (OFDMA), time division multiple access (TDMA), and/or code division multiple access (CDMA). The 802.11 protocol may include a multiple access technique. For example, the 802.11 protocol may include space-division multiple access (SDMA) and/or multi-user (MU) multiple-input and multiple-output (MU-MIMO). The HEW stations 104 may be configured to operate in accordance with MU-MIMO to concurrently transmit on a sub-channel in accordance with uplink MU-MIMO.

The HEW stations 104 may operate in accordance with 802.11ax or another standard of 802.11. The legacy devices 106 may operate in accordance with one or more of 802.11 a/g/ag/n/ac standards, or another legacy wireless communication standard. The HEW stations 104 may be high efficiency (HE) stations. The legacy devices 106 may be stations.

The HEW stations 104 may be wireless transmit and receive devices such as cellular telephones, handheld wireless devices, wireless glasses, wireless watches, wireless personal devices, tablets, or other devices that may be transmitting and receiving using the 802.11 protocol such as 802.11 ax or another wireless protocol.

The BSS 100 may operate on a primary channel and one or more secondary channels or sub-channels. The BSS 100 may include one or more master stations 102. In accordance with embodiments, the master station 102 may communicate with one or more of the HEW stations 104 on one or more of the secondary channels or sub-channels, or on the primary channel. In example embodiments, the master station 102 communicates with the legacy devices 106 on the primary channel. In example embodiments, the master station 102 may be configured to communicate concurrently with one or more of the HEW stations 104 on one or more of the secondary channels and a legacy device 106 utilizing only the primary channel and not utilizing any of the secondary channels.

The master station 102 may communicate with the legacy devices 106 in accordance with legacy IEEE 802.11 communication techniques. In example embodiments, the master station 102 may also be configured to communicate with the HEW stations 104 in accordance with legacy IEEE 802.11 communication techniques. Legacy IEEE 802.11 communication techniques may refer to any IEEE 802.11 communication technique prior to IEEE 802.11ax.

In some embodiments, a HEW frame may be configurable to have the same bandwidth, and the bandwidth may be one of a 20 MHz, 40 MHz, 80 MHz, 160 MHz, or 320 MHz contiguous bandwidth or an 80+80 MHz (160 MHz) non-contiguous bandwidth. In some embodiments, bandwidths of 1 MHz, 1.25 MHz, 2 MHz, 2.5 MHz, 5 MHz, 8 MHz, 10 MHz, and 16 MHz, or a combination thereof, may also be used, or another appropriate bandwidth may be used, which may be less than or equal to a total bandwidth. A HEW frame may be configured for transmitting a number of spatial streams.

In other embodiments, the master station 102, HEW station 104, and/or legacy device 106 may also implement different technologies, such as CDMA2000, CDMA2000 1×, CDMA2000 EV-DO, Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

In example embodiments, if the master station 102 transmits a beacon only on a primary channel, then the HEW stations 104 and legacy devices 106 need to receive the beacon on the primary channel every multiple of a beacon interval (e.g., every beacon interval, every 10th beacon interval, etc) to maintain their synchronization with the system (e.g., master station 102).

In an OFDMA system (e.g., 802.11ax), an associated HEW station 104 may operate on a sub-channel, which may be 20 MHz, of the BSS 100 (which can operate, for example, at 80 MHz). The HEW station 104 may enter a power save mode, and upon coming out of power save mode, the HEW station 104 may need to re-synchronize with the master station 102 or BSS 100 by receiving a beacon. If a beacon is transmitted only on the primary channel, then the HEW station 104 needs to move and tune to the primary channel upon coming out of power save mode to be able to receive beacons. Then the HEW station 104 needs to re-tune back to its operating sub-channel, which may be 20 MHz, or it has to follow a handshake procedure to let the master station 102 know of a new operating sub-channel. The HEW station 104 may risk losing some frames during the channel switch, in example embodiments.

In example embodiments, the HEW stations 104 and/or master station 102 are configured to generate, transmit, receive, and operate in accordance with beacon frames according to one or more of the embodiments disclosed herein in conjunction with FIGS. 1-7.

Some embodiments relate to high-efficiency wireless communications, including high-efficiency Wi-Fi, high-efficiency WLAN (HEW), and high-efficiency wireless communications. In accordance with some IEEE 802.1 lax (HEW) embodiments, the master station 102 may operate as a master station which may be arranged to contend for a wireless medium (e.g., during a contention period) to receive exclusive control of the medium for a HEW control period (i.e., a transmission opportunity (TXOP)). The master station 102 may transmit a HEW master-sync transmission at the beginning of the HEW control period. The master station 102 may transmit a time duration of the TXOP. During the HEW control period, the HEW stations 104 may communicate with the master station 102 in accordance with a non-contention based multipleaccess technique. This is unlike conventional WLAN communications in which devices communicate in accordance with a contention-based communication technique, rather than a multiple access technique. During the HEW control period, the master station 102 may communicate with the HEW stations 104 using one or more HEW frames. During the HEW control period, the legacy devices 106 may refrain from communicating. In some embodiments, the master-sync transmission may be referred to as a HEW control and schedule transmission.

In some embodiments, the multiple access technique used during the HEW control period may be a scheduled OFDMA technique, although this is not a requirement. In some embodiments, the multiple access technique may be a TDMA technique or an FDMA technique. In some embodiments, the multiple access technique may be an SDMA technique.

The master station 102 may also communicate with the legacy devices 106 in accordance with legacy IEEE 802.11 communication techniques. In some embodiments, the master station 102 may also be configurable communicate with the HEW stations 104 outside the HEW control period in accordance with legacy IEEE 802.11 communication techniques, although this is not a requirement.

Figure 2:
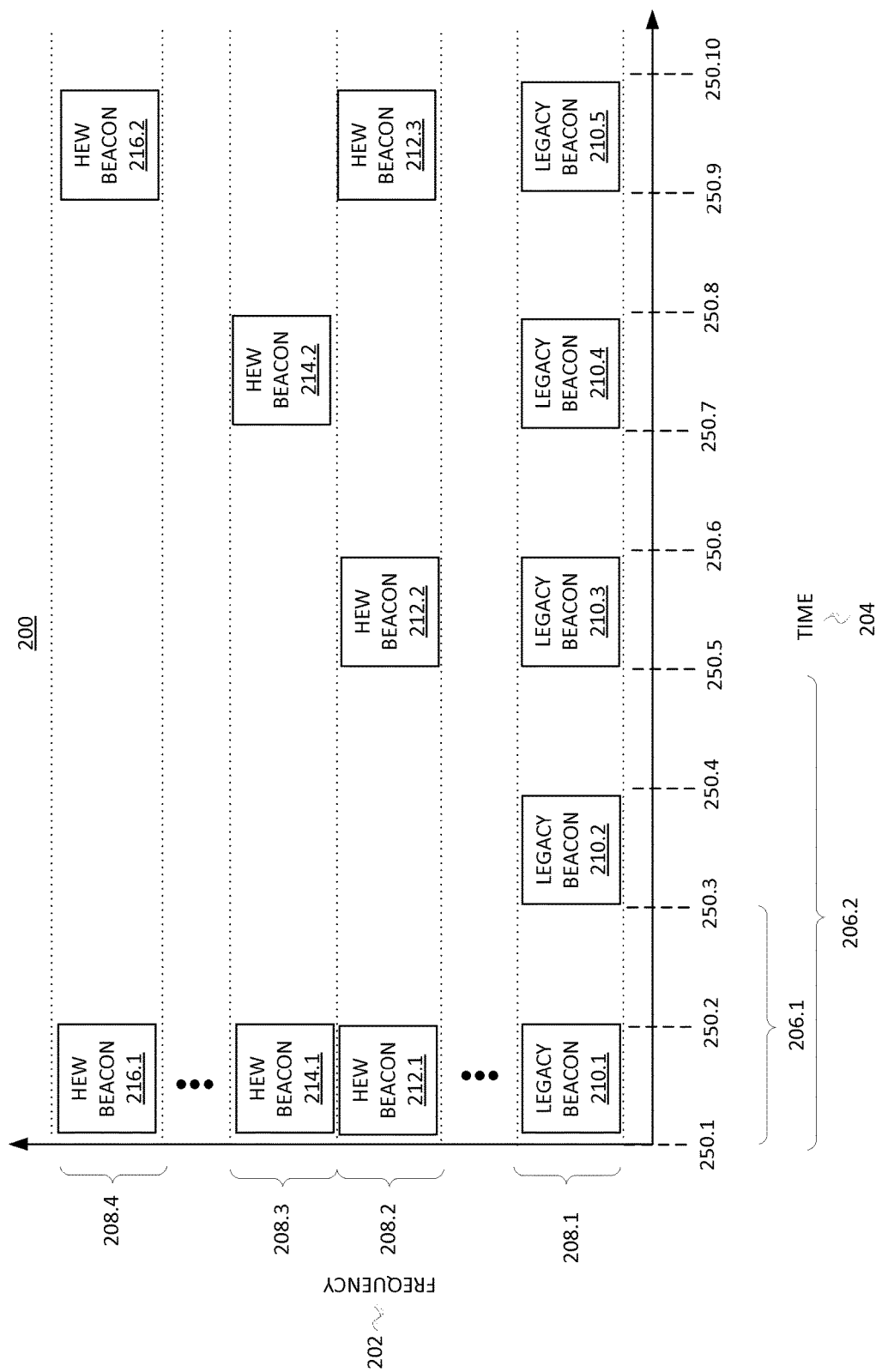
FIG. 2 illustrates transmission of beacons according to example embodiments.

FIG. 2 is a diagram 200 illustrating transmission of beacons according to example embodiments. Illustrated in FIG. 2 are frequency 202 along a vertical axis, time 204 along a horizontal axis, periodicities 206, sub-channels 208, a legacy beacon 210, and HEW beacons 212, 214, 216. A master station 102 may be transmitting the legacy beacon 210 and HEW beacons 212, 214, 216 to one or more HEW stations 104 and/or legacy devices 106.

Each of the sub-channels 208 may be a portion of a bandwidth. For example, the sub-channel 208.1 may be 20 MHz and may be a primary channel of a BSS 100 in which the master station 102 transmits the legacy beacon 210 to the legacy devices 106 and/or HEW stations 104. The sub-channels 208 may be adjacent to one another. For example, the sub-channels 208 may be as follows: 208.1 20 MHz, 208.2 the next 20 MHz in the bandwidth, 208.3 the next 20 MHz in the bandwidth, and 208.4 the next 20 MHz in the bandwidth. For example, the bandwidth may be 80 MHz and the sub-channels each 20 MHz, in which case the sub-channels 208.1, 208.2, 208.3, and 208.4 would be adjacent to one another and occupy the entire 80 MHz bandwidth. In other embodiments, the sub-channels 208 may be of different sizes. For example, the sub-channel 208.1 may be 20 MHz and the sub-channel 208.2 may be 5 MHz. The sub-channels 208 may be larger than 20 MHz and/or smaller than 20 MHz. Other data may be transmitted at the same time as the legacy beacon 210 and HEW beacons 212, 214, 216.

The transmission of the master station 102 in the sub-channels 208 may be in accordance with OFDMA. In example embodiments, the sub-channels 208 may be spatially diverse. In example embodiments, the transmission of the master station 102 in the sub-channels 208 may be in accordance with MIMO-MU.

Other devices, such as the HEW stations 104, master station 102, and/or legacy devices 106, may transmit on other portions of the bandwidth on which the master station 102 is not transmitting the legacy beacon 210 and/or HEW beacons 212, 214, 216. The time 204 may be divided into some time units 250, such as portions of a second, so that the time between 250.1 and 250.2 may be, for example, one thousandth of a second.

The master station 102 may be configured to transmit the beacons 210, 212, 214, 216 with a periodicity 206. For example, as illustrated, the legacy beacon 210 may be transmitted with a periodicity 206.1 of every two time units 250. In example embodiments, the master station 102 may be configured to transmit the HEW beacons 212, 214, 216 at a periodicity 206 that is based on the periodicity 206.1 of the legacy beacon 210. For example, the periodicity 206.2 of the HEW beacon 212.1 (transmitted at 250.1, 250.5, 250.9, etc.) may be twice the periodicity 206.1 of the legacy beacon 210 (transmitted at 250.1, 250.3, 250.5, etc.); the periodicity (not illustrated) of the HEW beacon 214 (transmitted at 250.1, 250.7, 250.13, etc.) may be three times the periodicity 206.1 of the legacy beacon 210; and the periodicity (not illustrated) of the HEW beacon 216 (transmitted at 250.1, 250.9, 250.17, etc.) may be four times the periodicity 206.1 of the legacy beacon 210.

In example embodiments, the master station 102 may transmit the legacy beacon 210 and HEW beacons 212, 214, 216 at different start times. For example, the master station 102 may transmit the HEW beacon 212.1 at 250.2, 250.6, 250.10, etc. In example embodiments, the periodicities 206 of the HEW beacons 212, 214, 216 are integral multiples of the periodicity 206.1 or interval of the legacy beacon 210 on the sub-channel 208.1, which may be the primary channel. In example embodiments, causing the periodicities 206 of the HEW beacons 212, 214, 216 to be multiples of the periodicity 206.1 or interval of the legacy beacon 210 reduces the number of bits that need to be carried to indicate when the HEW beacons 212, 214, 216 will be transmitted. This may reduce the sizes of the HEW beacons 212, 214, 216, and/or the legacy beacon 210.

In example embodiments, the periodicity 206 for transmitting the HEW beacons 212, 214, 216 may be irregular. For example, the periodicity 206 may increase with each transmission of the HEW beacon 212, causing the HEW beacon 212 to be transmitted at 250.1, 250.4, 250.10, 250.22, etc.

The legacy beacon 210 and/or HEW beacons 212, 214, 216 may include system information for the HEW stations 104 and legacy devices 106. In example embodiments, the master station 102 may transmit a duplicate of the legacy beacon 210 on one or more of the sub-channels 208.

In example embodiments, the legacy beacon 210 and HEW beacons 212, 214, 216, include different information intended for different sub-channels 208. In example embodiments, the legacy beacon 210 and/or HEW beacons 212, 214, 216 may include a delivery traffic indication map (DTIM) that may inform the HEW station 104 that the master station 102 has data for the HEW station 104. The HEW station 104 may then tune to an appropriate sub-channel 208 to receive the data. In example embodiments, the HEW station 104 may tune to a sub-channel 208 and receive the HEW beacon 212, 214, 216 and sleep if there is no data for the HEW station 104 until the next HEW beacon 212, 214, 216. In example embodiments, the HEW station 104 may be assigned to a sub-channel 208 and periodicity 206 based on how frequently the HEW station 104 should wake up to check if there is data. This may have the technical effect of saving power by allowing the HEW station 104 to sleep. In example embodiments, the HEW stations 104 may indicate to the master station 102 a sub-channel 208 and/or periodicity 206 that the HEW station 104 would like to be assigned. In example embodiments, the HEW stations 104 may indicate to the master station 102 a sub-channel 208 and/or periodicity 206 that the HEW station 104 is going to tune to. In example embodiments, the master station 102 may transmit an indication of sub-channels 208 with their periodicities 206 of HEW beacons 212, 214, 216.

In example embodiments, the HEW station 104 may tune to a different sub-channel 208 to receive the legacy beacon 210. In example embodiments, the master station 102 may be configured to transmit the legacy beacon 210 on more than one sub-channel 208.

Figure 3:
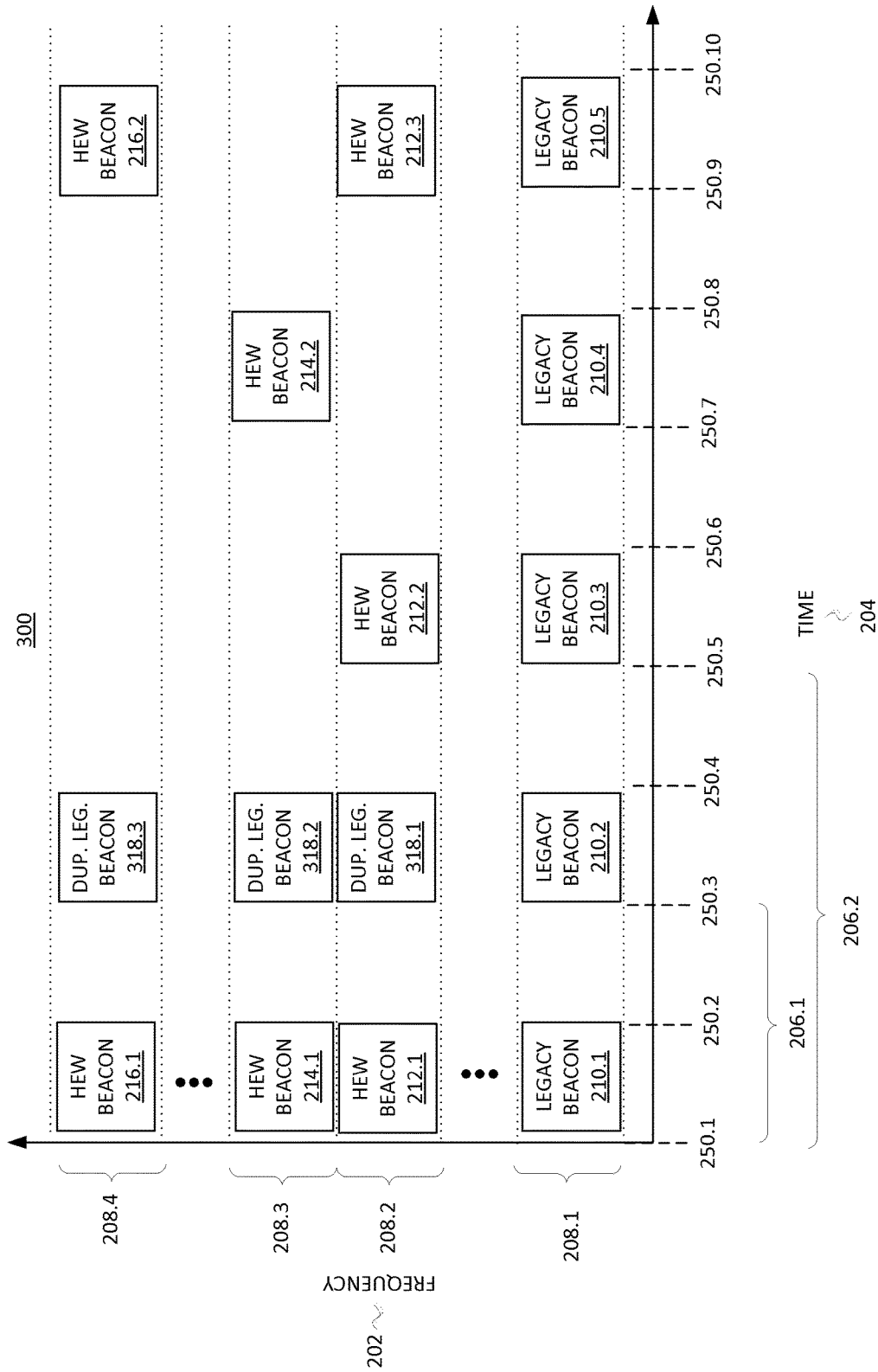
FIG. 3 illustrates transmission of beacons where a legacy beacon is duplicated on multiple sub-channels, according to example embodiments.

FIG. 3 is a diagram 300 illustrating transmission of beacons where a legacy beacon is duplicated on multiple sub-channels, according to example embodiments. Illustrated in FIG. 3 are frequency 202 along a vertical axis, time 204 along a horizontal axis, periodicities 206, sub-channels 208, a legacy beacon 210, HEW beacons 212, 214, 216, and duplicated legacy beacons 318. A master station 102 may be transmitting the legacy beacon 210, HEW beacons 212, 214, 216, and duplicated legacy beacons 318 to one or more HEW stations 104 and/or legacy devices 106.

The duplicated legacy beacons 318 may be duplicates of the legacy beacon 210. The master station 102 may transmit the duplicated legacy beacons 318 on one or more of the sub-channels 208, which may have the technical effect of allowing the HEW stations 104 to remain tuned to a sub-channel 208 (e.g., sub-channel 208.2, 208.3, 208.4) without having to re-tune to the sub-channel 208.1 to receive the legacy beacon 210. This may save power and may ensure that the HEW stations 104 receive any transmission on the sub-channel 208 to which they are tuned.

In example embodiments, the master station 102 may transmit the duplicated legacy beacons 318 at different times. For example, the master station 102 may transmit a duplicated legacy beacon 318.2 at time 250.8 right after the HEW beacon 214.2 rather than at time 250.3. The master station 102 may be configured to transmit the duplicated legacy beacon 318 based on the periodicity 206 of the HEW beacon 212 on a sub-channel 208.

Figure 4:
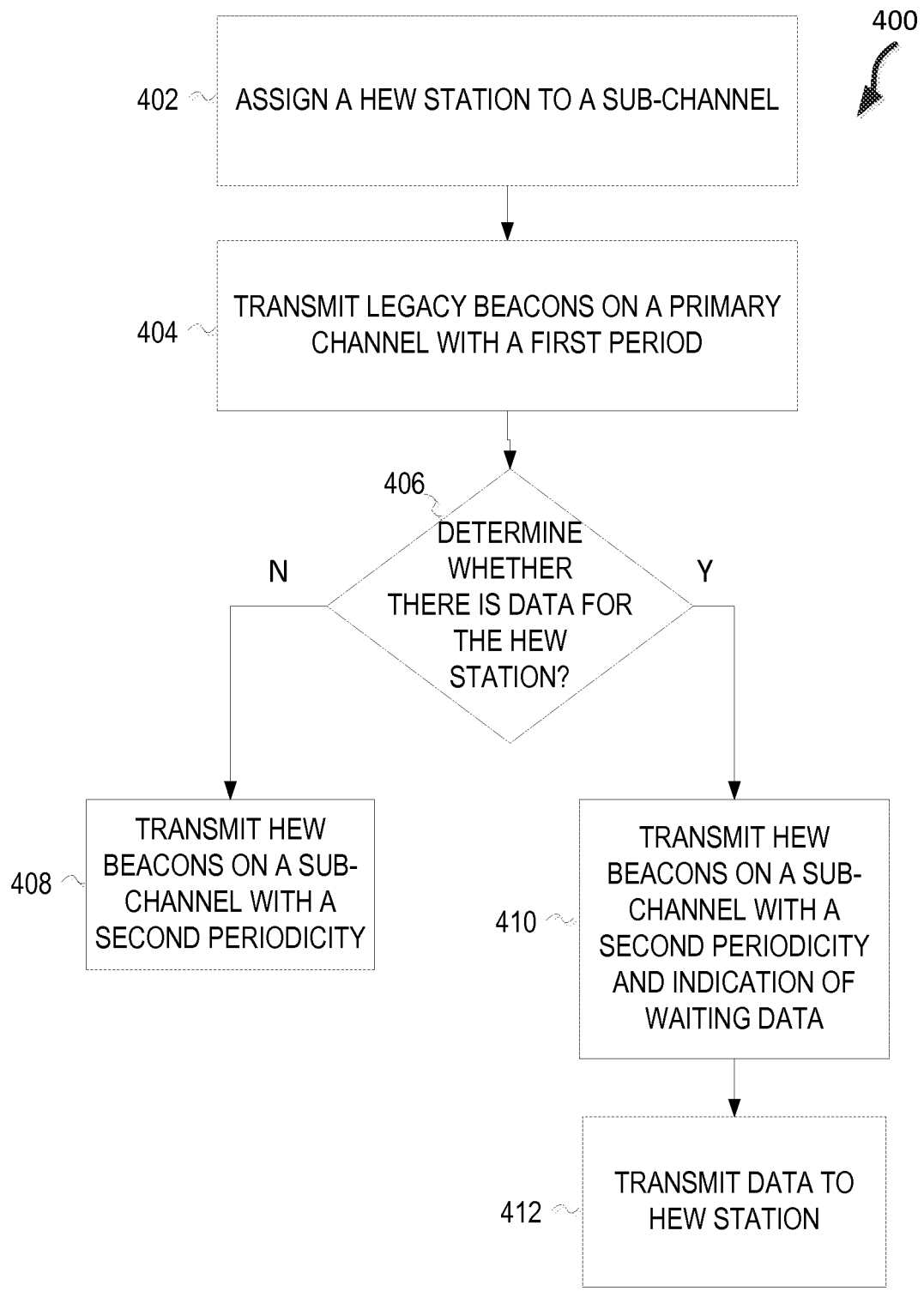
FIG. 4 illustrates a method for transmitting beacon frames on different sub-channels, according to example embodiments.

FIG. 4 illustrates a method 400 for transmitting beacon frames on different sub-channels, according to example embodiments. The method 400 may begin at operation 402 with assigning a HEW station to a sub-channel. For example, a master station 102 may assign a HEW station 104 to a sub-channel based on a periodicity of the sub-channel. In example embodiments, the periodicities of the sub-channels may be broadcast in a beacon frame on a primary channel. The HEW station 104 may receive the beacon frame, select a sub-channel, and transmit the selection to the master station 102. In some embodiments, the HEW station 104 may transmit an indication of how often the HEW station 104 wants to receive data or stay in a power saving mode. The master station 102 may assign the HEW station 104 to a sub-channel based on how often the HEW station 104 wants to receive data or stay in a power saving mode. In some embodiments, the master station 102 may assign the HEW station 104 to a sub-channel based on how many other HEW stations 104 are assigned to sub-channels. In some embodiments, the master station 102 may assign the HEW station 104 to a sub-channel based on one or more rules for sub-channels based on a type of the HEW station 104. For example, the HEW station 104 may transmit an information element to the master station 102 indicating that the HEW station 104 is a low power HEW station 104, such as a meter reading HEW station 104.

In some embodiments, the master station 102 may assign the HEW station 104 to a sub-channel with a periodicity and then move the HEW station 104 to a sub-channel with a higher or lower periodicity based on how much data the HEW station 104 receives.

The method 400 may continue at operation 404 with transmitting legacy beacons on a primary channel with a first periodicity. For example, the master station 102 may transmit a legacy beacon on a primary channel 208.1 in accordance with one or more legacy standards.

The method 400 may continue at operation 406 with determining whether there is data for the HEW station 104. The master station 102 may keep data which may include messages for the HEW station 104 while the HEW station 104 is in a power saving mode.

If there is not data for the HEW station 104, then the method 400 may continue at operation 408 with transmitting HEW beacons on a sub-channel with a second periodicity. For example, the master station 102 may transmit a HEW beacon 212. The method 400 may then return to operation 404.

Returning to operation 406, if there is data for the HEW station 104, then the method 400 may continue at operation 410 with transmitting HEW beacons on a sub-channel with a second periodicity and an indication of waiting data. For example, there may be data for the HEW station 104 that the master station 102 has buffered. The master station 102 may generate a beacon such as the HEW beacon 212.2 with an indication that there is data for the HEW station 104. The HEW beacon may also include information that the HEW station 104 may use to receive the data. The method 400 may continue at operation 412 with transmitting the data to the HEW station 104. For example, the master station 102 may broadcast messages on the primary channel 208.1 for the HEW station 104, or may transmit data on one or more sub-channels 208 for the HEW station 104. In some embodiments, the master station 102 may include an indication of a duration for the data in the HEW beacon and may transmit the data on the assigned sub-channel 208. The method 400 may then return to operation 404.

Figure 5:
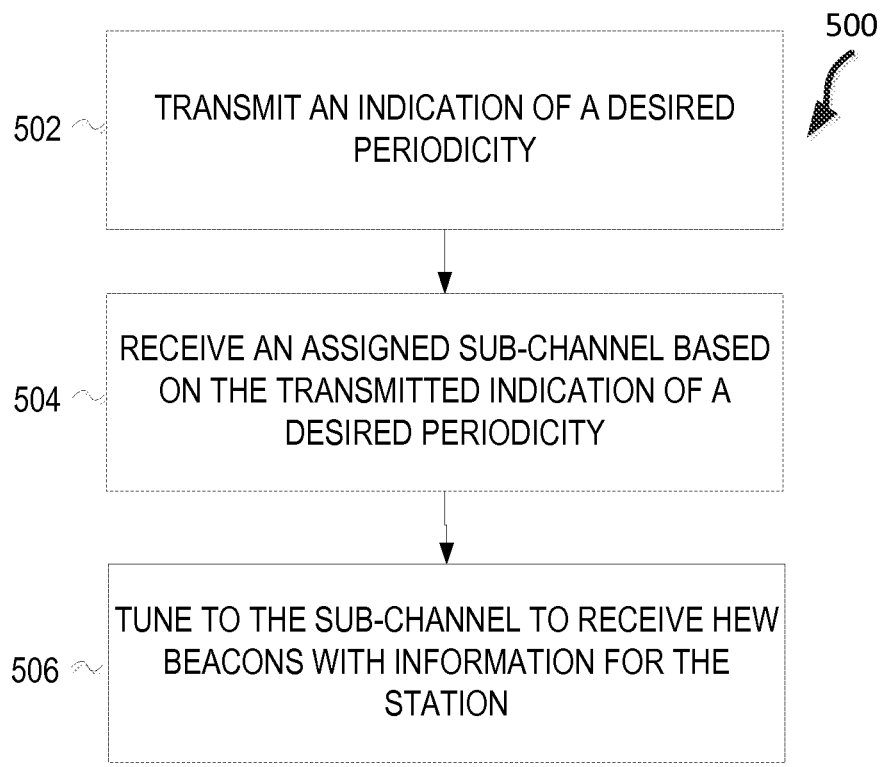
FIG. 5 illustrates a method for transmitting beacon frames on different sub-channels, according to example embodiments.

FIG. 5 illustrates a method 500 for transmitting beacon frames on different sub-channels, according to example embodiments. The method 500 may begin at operation 502 with transmitting an indication of a desired periodicity. For example, the HEW station 104 may indicate a desired periodicity based on one or more standards. The HEW station 104 may indicate a power saving mode or category of the HEW station 104. For example, the HEW station 104 may indicate that the HEW station 104 is a low-power device or low-complexity device. The method 500 continues at operation 504 with receiving an assigned sub-channel based on the transmitted indication of the desired periodicity. For example, the HEW station 104 may receive an indication of a sub-channel 208.2. The method 500 continues at operation 506 with tuning to the sub-channel to receive HEW beacons with information for the station. For example, the HEW station 104 may tune to the sub-channel 208.2, enter sleep mode until a time 250.5, and then receive a HEW beacon 212.2. The HEW beacon 212.2 may have information for the HEW station 104 if the master station 102 wants to communicate with the HEW station 104. For example, the HEW beacon 212.2 may include information that the master station 102 has data for the HEW station 104, in which case the HEW station 104 may operate in accordance with the indication of data to receive the data. For example, the HEW station 104 may not enter power save mode and may instead receive the data on the assigned sub-channel 208.2, or the HEW station 104 may tune to another sub-channel 208, including the primary channel, to receive the data.

Figure 6:
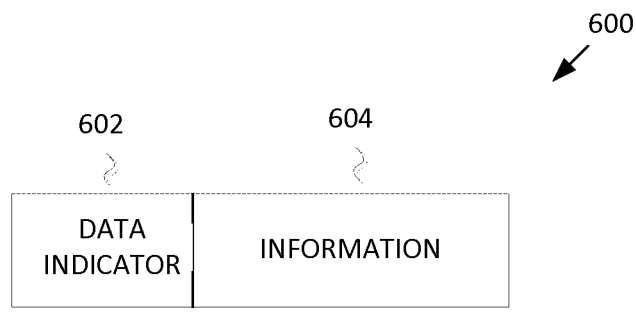
FIG. 6 illustrates a HEW beacon according to example embodiments.

FIG. 6 illustrates a HEW beacon 600 according to example embodiments. The HEW beacon 600 may be a format for the HEW station 104, which may be a new format. The HEW beacon 600 may include a data indicator 602 that data is waiting for the HEW station 104 at the master station 102, and may also include information 604. In example embodiments, some legacy devices 106 may not be able to interpret the HEW beacons 600. In example embodiments, the HEW beacon 600 includes with the data indicator 602 instructions for how the HEW station 104 is to receive the data. For example, the data indicator 602 may include a sub-channel and duration for the HEW station 104 to receive the data, or the data indicator 602 may indicate that the HEW station 104 should tune to the primary channel to receive the data. The data may include messages, notifications, or changes to the operation of the master station 102. For example, the master station 102 may determine to reset assignments and request that the HEW station 104 re-tune to the primary channel. The information 604 may include information that is included in legacy beacons, such as timing information so that the HEW station 104 can adjust its timing.

Example embodiments may have the technical effect of enabling the legacy devices 106 to coexist with the HEW stations 104, and enabling the master station 102 to manage the legacy devices 106 on a primary sub-channel 208 while managing the HEW stations 104 on other sub-channels 208 using OFDMA.

Figure 7:
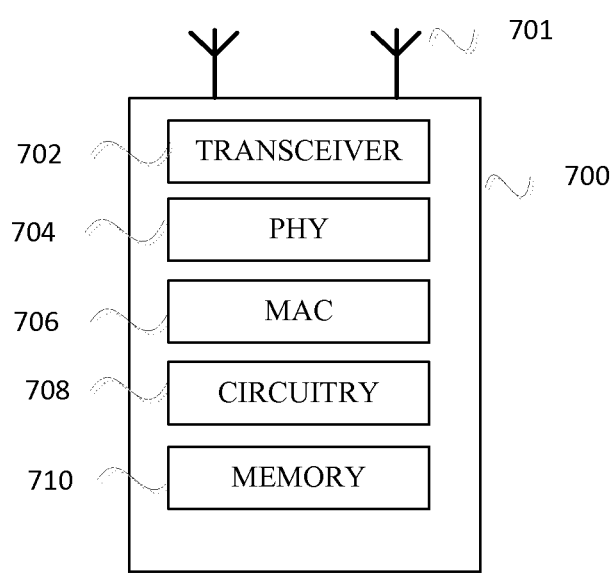
FIG. 7 illustrates a HEW device in accordance with some embodiments.

FIG. 7 illustrates a HEW station and/or master station 700 in accordance with some embodiments. The HEW station and/or master station 700 may be a HEW compliant device that may be arranged to communicate with one or more other HEW devices, such as the HEW stations 104 (FIG. 1) or the master station 102 (FIG. 1), as well as to communicate with the legacy devices 106 (FIG. 1). The HEW stations 104 and master station 102 may also be referred to as HEW devices. The HEW station and/or master station 700 may be suitable for operating as the master station 102 or the HEW station 104. In accordance with embodiments, the HEW station and/or master station 700 may include, among other things, a transmit/receive element (for example an antenna) 701, a transceiver 702, physical layer circuitry (PHY) 704, and medium-access control layer circuitry (MAC) 706. The PHY 704 and the MAC 706 may be HEW compliant layers and may also be compliant with one or more legacy IEEE 802.11 standards. The MAC 706 may be arranged to configure physical protocol data units (PPDUs) and to transmit and receive PPDUs, among other things. The HEW station and/or master station 700 may also include other circuitry 708 and memory 710 configured to perform the various operations described herein. The circuitry 708 may be coupled to the transceiver 702, which may be coupled to the transmit/receive element, which may be referred to as an antenna 701. While FIG. 7 depicts the circuitry 708 and the transceiver 702 as separate components, the circuitry 708 and the transceiver 702 may be integrated together in an electronic package or chip.

In some embodiments, the MAC 706 may be arranged to contend for a wireless medium during a contention period to receive control of the medium for a HEW control period and configure a HEW PPDU. In some embodiments, the MAC 706 may be arranged to contend for the wireless medium based on channel contention settings, a transmitting power level, and a clear channel assessment (CCA) level.

The PHY 704 may be arranged to transmit the HEW PPDU. The PHY 704 may include circuitry for modulation/demodulation, upconversion/downconversion, filtering, amplification, etc. In some embodiments, the circuitry 708 may include one or more processors. The circuitry 708 may be configured to perform functions based on instructions being stored in a RAM or ROM, or based on special purpose circuitry. In some embodiments, the circuitry 708 may be configured to perform one or more of the functions described herein in conjunction with FIGS. 1-7.

In some embodiments, two or more antennas 701 may be coupled to the PHY 704 and arranged for sending and receiving signals including transmission of HEW packets.

The transceiver 702 may transmit and receive data such as the HEW PPDU and packets that include an indication that the HEW station and/or master station 700 should adapt the channel contention settings according to settings included in the packet. The memory 710 may store information for configuring the other circuitry to perform operations for configuring and transmitting HEW beacons and performing the various operations described herein in conjunction with FIGS. 1-6, such as generating HEW beacons and operating in accordance with the HEW beacons.

In some embodiments, the HEW station and/or master station 700 may be configured to communicate using OFDM communication signals over a multicarrier communication channel. In some embodiments, the HEW station and/or master station 700 may be configured to communicate in accordance with one or more specific communication standards, such as the Institute of Electrical and Electronics Engineers (IEEE) standards, including IEEE 802.11-2012, 802.11n-2009, 802.11ac-2013, 802.11ax, DensiFi, standards and/or proposed specifications for WLANs, or other standards as described in conjunction with FIG. 1, although the scope of the disclosed embodiments is not limited in this respect, as they may also be suitable to transmit and/or receive communications in accordance with other techniques and standards. In some embodiments, the HEW station and/or master station 700 may use 4× symbol duration of 802.11n or 802.11ac.

In some embodiments, the HEW station and/or master station 700 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a base station, a transmit/receive device for a wireless standard such as 802.11 or 802.16, or another device that may receive and/or transmit information wirelessly. In some embodiments, the portable wireless communication device may include one or more of a keyboard, a display, a non-volatile memory port, multiple antennas 701, a graphics processor, an application processor, speakers, and other mobile device elements. The display may be an LCD screen, including a touch screen.

The antennas 701 may comprise one or more directional or omnidirectional antennas, including, for example, dipole antennas, monopole antennas, patch antennas, loop antennas, microstrip antennas, or other types of antennas suitable for transmission of RF signals. In some multiple-input multiple-output (MIMO) embodiments, the antennas 701 may be effectively separated to take advantage of spatial diversity and the different channel characteristics that may result.

Although the HEW station and/or master station 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs), and combinations of various hardware and logic circuitry for performing at least the functions described herein. In some embodiments, the functional elements may refer to one or more processes operating on one or more processing elements.

The following examples pertain to further embodiments. Example 1 is a master station. The master station may include circuitry configured to: operate in accordance with orthogonal frequency division multiple access (OFDMA) on a plurality of sub-channels and a primary channel; assign a high-efficiency wireless local-area network (HEW) station to a sub-channel based on at least one of the following group: an estimated frequency of data for the HEW station, a power saving parameter of the HEW station, and an indication from the HEW station of a requested periodicity of HEW beacon; transmit a legacy beacon on the primary channel within a first period; and, transmit a HEW beacon on the sub-channel within a second period. The second period may be greater than the first period. The HEW beacon may include an indication of whether the master station has data for the HEW station.

In Example 2, the subject matter of Example 1 can optionally include where the circuitry is further configured to: determine that the HEW station has the data at the master station; and transmit the HEW beacon on the sub-channel with the indication that the master station has the data for the HEW station.

In Example 3, the subject matter of Examples 1 or 2 can optionally include where the circuitry is further configured to transmit the data to the HEW station in accordance with information in the HEW beacon.

In Example 4, the subject matter of any of Examples 1-3 can optionally include where the sub-channel is 20 MHz or less and wherein the primary channel is 20 MHz.

In Example 5, the subject matter of any of Examples 1-4 can optionally include where the second period is an integer multiple of the first period.

In Example 6, the subject matter of any of Examples 1-5 can optionally include where the circuitry is further configured to: assign a second HEW station to a second sub-channel; and transmit to the second HEW station a second HEW beacon on the second sub-channel within a third period. The third period may be greater than the first period and the second period. The second HEW beacon may include an indication of whether the master station has data for the second HEW station.

In Example 7, the subject matter of Example 6 can optionally include where the second HEW beacon includes information for the second HEW station, and where the HEW beacon includes information for the HEW station.

In Example 8, the subject matter of any of Examples 1-7 can optionally include where the legacy beacon is transmitted to one or more legacy devices.

In Example 9, the subject matter of any of Examples 1-8 can optionally include where the circuitry is further configured to transmit a duplicate of the legacy beacon on the sub-channel.

In Example 10, the subject matter of any of Examples 1-9 can optionally include where the legacy beacon is an Institute of Electrical and Electronic Engineers (IEEE) 802.11 legacy beacon and the HEW beacon is an IEEE 802.11ax beacon.

In Example 11, the subject matter of any of Examples 1-10 can optionally include where the circuitry is further configured to receive from the HEW station an indication of how long the HEW station is to go into a power saving mode or how frequently the HEW station is to receive data; and assign the HEW station to the sub-channel based on the indication of how long the HEW station is to go into the power saving mode or how frequently the HEW station is to receive the data.

In Example 12, the subject matter of any of Examples 1-12 can optionally include where the master station is one from the following group: an Institute of Electrical and Electronic Engineers (IEEE) 802.11ax access point and an IEEE 802.11ax station.

In Example 13, the subject matter of any of Examples 1-12 can optionally include where the circuitry is further configured to transmit to the HEW station an indication of available sub-channels; receive from the HEW station a selection of the sub-channel from the available sub-channels; and assign the HEW station to the sub-channel based on the selection.

In Example 14, the subject matter of any of Examples 1-13 can optionally include memory coupled to the circuitry, and a transceiver coupled to the circuitry.

In Example 15, the subject matter of Example 14 can optionally include one or more antennas coupled to the transceiver.

Example 16 is a method performed by a master station. The method may include assigning a high-efficiency wireless local-area network (HEW) station to a sub-channel; transmitting a legacy beacon on a primary channel within a first period; and transmitting, in accordance with orthogonal frequency division multiple access (OFDMA), a HEW beacon on the sub-channel within a second period. The second period may be greater than the first period, and the HEW beacon may include an indication of whether the master station has data for the HEW station.

In Example 17, the subject matter of Example 16 can optionally include determining that the HEW station has the data at the master station; and transmitting the HEW beacon on the sub-channel with the indication that the HEW station has the data.

In Example 18, the subject matter of Examples 16 or 17 can optionally include ims 16 or 17, wherein the master station is one from the following group: an Institute of Electrical and Electronic Engineers (IEEE) 802.11 ax access point and an IEEE 802.11 ax station.

In Example 19, the subject matter of any of Examples 16-18 can optionally include where assigning the HEW station to the sub-channel is based on at least one of the following group: an estimated frequency of data for the HEW station, a power saving parameter of the HEW station, and an indication from the HEW station of a requested periodicity of the HEW beacon.

Example 20 is a high-efficiency wireless local-area network (HEW) station. The HEW station may include circuitry configured to: transmit an indication of a desired periodicity of HEW beacons to a master station on a primary channel; receive an indication of an assigned sub-channel for the HEW station, wherein the assigned sub-channel is based on the desired periodicity of HEW beacons; tune to the assigned sub-channel; receive a HEW beacon on the assigned sub-channel; and operate in accordance with orthogonal frequency division multiple access (OFDMA).

In Example 21, the subject matter of Example 20 can optionally include where the circuitry is further configured to: enter a power saving mode for a period of time based on the assigned sub-channel after the receipt of the HEW beacon, if the HEW beacon indicates that the HEW station does not have data for the HEW station at the master station.

In Example 22, the subject matter of Examples 20 or 21 can optionally include where the circuitry is further configured to: if the HEW beacon indicates that the HEW station has data for the HEW station at the master station, then receive the data in accordance with a data transmission from the master station.

In Example 23, the subject matter of any of Examples 20-22 can optionally include memory coupled to the circuitry; a transceiver coupled to the circuitry, and one or more antennas coupled to the transceiver.

Example 24 is a non-transitory computer-readable storage medium that stores instructions for execution by one or more processors to perform operations. The operations are to configure a master station to: operate in accordance with orthogonal frequency division multiple access (OFDMA) on a plurality of sub-channels and a primary channel; assign a high-efficiency wireless local-area network (HEW) station to a sub-channel; transmit a legacy beacon on the primary channel within a first period; and transmit a HEW beacon on the sub-channel within a second period, wherein the second period is greater than the first period.

In Example 25, the subject matter of Example 24 can optionally include where the operations further configure the master station to: determine that the HEW station has data at the master station; and transmit the HEW beacon on the sub-channel with an indication that the HEW station has the data.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a high-efficiency (HE) access point (AP), the apparatus comprising: memory; and, processing circuitry coupled to the memory, the processing circuitry configured to:
    assign a first HE station to a first sub-channel based on at least one of the following group: an estimated frequency of data for the first HE station, a power saving parameter of the first HE station, and an indication from the first HE station of a requested periodicity of HE beacons;
    cause a legacy beacon to be transmitted on a primary channel within a first period in accordance with orthogonal frequency division multiple access (OFDMA);
    cause a first HE beacon to be transmitted on the first sub-channel within a second period, wherein the second period is greater than the first period, and wherein the first HE beacon comprises an indication of whether the HE AP has data for the first HE station;
    assign a second HE station to a second sub-channel; and
    cause a second HE beacon to be transmitted on the second sub-channel within a third period, wherein the third period is greater than the first period and the second period, and wherein the second HE beacon comprises an indication of whether the HE AP has data for the second HE station.

2. The apparatus of claim 1, wherein the processing circuitry is further configured to:
    determine that the first HE station has the data at the HE AP; and
    cause the first HE beacon to be transmitted on the first sub-channel with the indication that the HE AP has the data for the first HE station.

3. The apparatus of claim 2, wherein the processing circuitry is further configured to:
cause the data to be transmitted to the first HE station in accordance with information in the first HE beacon.

4. The apparatus of claim 1, wherein the first sub-channel is 20 MHz or less and wherein the primary channel is 20 MHz.

5. The apparatus of claim 1, wherein the second period is an integer multiple of the first period.

6. The apparatus of claim 1, wherein the second HE beacon includes information for the second HE station, and wherein the first HE beacon includes information for the first HE station.

7. The apparatus of claim 1, wherein the legacy beacon is transmitted to one or more legacy devices.

8. The apparatus of claim 1, wherein the processing circuitry is further configured to:
cause a duplicate of the legacy beacon to be transmitted on the first sub-channel.

9. The apparatus of claim 1, wherein the legacy beacon is an Institute of Electrical and Electronic Engineers (IEEE) 802.11 legacy beacon and the HE beacon is an IEEE 802.11ax beacon.

10. The apparatus of claim 1, wherein the processing circuitry is further configured to:
decode a packet from the first HE station, the packet comprising an indication of how long the first HE station is to go into a power saving mode or how frequently the first HE station is to receive data; and
assign the first HE station to the first sub-channel based on the indication of how long the first HE station is to go into the power saving mode or how frequently the first HE station is to receive the data.

11. The apparatus of claim 1, wherein the HE AP is one from the following group: an Institute of Electrical and Electronic Engineers (IEEE) 802.11ax access point and an IEEE 802.11ax station.

12. The apparatus of claim 1, wherein the processing circuitry is further configured to:
cause an indication of available sub-channels to be transmitted to the first HE station;
decode a packet from the first HE station, wherein the packet comprises a selection of the first sub-channel from the available sub-channels; and
assign the first HE station to the first sub-channel based on the selection.

13. The apparatus of claim 1, further comprising transceiver circuitry coupled to the processing circuitry.

14. The apparatus of claim 13, further comprising one or more antennas coupled to the transceiver circuitry.

15. A method performed by an apparatus of a high-efficiency (HE) access point (AP), the method comprising:
assigning a first HE station to a first sub-channel;
causing a legacy beacon to be transmitted on a primary channel within a first period in accordance with orthogonal frequency division multiple access (OFDMA);
causing a first HE beacon to be transmitted on the first sub-channel within a second period, wherein the second period is greater than the first period, and wherein the first HE beacon comprises an indication of whether the HE AP has data for the first HE station;
assigning a second HE station to a second sub-channel; and
causing a second HE beacon to be transmitted on the second sub-channel within a third period, wherein the third period is greater than the first period and the second period, and wherein the second HE beacon comprises an indication of whether the HE AP has data for the second HE station.

16. The method of claim 15, further comprising:
determining that the first HE station has the data at the HE AP; and
causing the first HE beacon to be transmitted on the first sub-channel with the indication that the HE AP has the data for the first HE station.

17. The method of claim 15, wherein the HE AP is one from the following group: an Institute of Electrical and Electronic Engineers (IEEE) 802.11ax access point and an IEEE 802.11ax station.

18. The method of claim 15, wherein assigning the first HE station to the first sub-channel is based on at least one of the following group: an estimated frequency of data for the first HE station, a power saving parameter of the first HE station, and an indication from the first HE station of a requested periodicity of the HE beacon.

19. A non-transitory computer-readable storage medium that stores instructions for execution by one or more processors of an apparatus of an high-efficiency (HE) access point (AP), the instructions to configure the one or more processors to:
assign a first HE station to a first sub-channel;
cause a legacy beacon to be transmitted on a primary channel within a first period in accordance with orthogonal frequency division multiple access (OFDMA);
cause a first HE beacon to be transmitted on the first sub-channel within a second period, wherein the second period is greater than the first period, and wherein the first HE beacon comprises an indication of whether the HE AP has data for the first HE station;
assign a second HE station to a second sub-channel; and
cause a second HE beacon to be transmitted on the second sub-channel within a third period, wherein the third period is greater than the first period and the second period, and wherein the second HE beacon comprises an indication of whether the HE AP has data for the second HE station.

20. The non-transitory computer-readable storage medium of claim 19, wherein the instructions further configure the one or more processors to:
determine that the first HE station has data at the HE, AP; and
transmit the first HE beacon on the first sub-channel with an indication that the first HE station has the data.

21. The apparatus of claim 1, wherein the memory is configured to store the legacy beacon.

* * * * *